(12) United States Patent
Yamaguchi et al.

(10) Patent No.: US 12,106,270 B2
(45) Date of Patent: Oct. 1, 2024

(54) REFRIGERANT QUALITY CONTROL SYSTEM AND REFRIGERANT QUALITY CONTROL METHOD

(71) Applicants: DAIKIN INDUSTRIES, LTD., Osaka (JP); DAIKIN EUROPE N.V., Ostend (BE); DAIKIN AIRCONDITIONING CENTRAL EUROPE HANDELSGMBH, Vienna (AT)

(72) Inventors: Takahiro Yamaguchi, Ostend (BE); Tadashi Hirose, Osaka (JP); Suguru Seikoba, Osaka (JP); Yumi Yamaguchi, Osaka (JP); Hrvoje Krapanic, Vienna (AT); Erlend Ingebrigtsen, Vienna (AT); Daniel Kobelt, Vienna (AT); Nikolaos Barmparitsas, Ostend (BE)

(73) Assignees: Daikin Industries, Ltd., Osaka (JP); DAIKIN EUROPE N.V., Ostend (BE); DAIKIN AIRCONDITIONING CENTRAL EUROPE HANDELSGMBH, Vienna (AT)

( * ) Notice: Subject to any disclaimer, the term of this patent is extended or adjusted under 35 U.S.C. 154(b) by 271 days.

(21) Appl. No.: 17/686,134

(22) Filed: Mar. 3, 2022

(65) Prior Publication Data
US 2022/0318768 A1 Oct. 6, 2022

Related U.S. Application Data

(63) Continuation of application No. PCT/JP2019/035677, filed on Sep. 11, 2019.

(51) Int. Cl.
*G06Q 10/00* (2023.01)
*F25B 45/00* (2006.01)
*G06Q 10/30* (2023.01)

(52) U.S. Cl.
CPC .............. *G06Q 10/30* (2013.01); *F25B 45/00* (2013.01); *F25B 2400/23* (2013.01)

(58) Field of Classification Search
CPC ........ G06Q 10/30; G06Q 30/06; F25B 45/00; F25B 2400/23; F25B 2345/002; F25B 2345/001
See application file for complete search history.

(56) References Cited

U.S. PATENT DOCUMENTS

2020/0309431 A1  10/2020  Mimura et al.

FOREIGN PATENT DOCUMENTS

| JP | 4-93566 A | 3/1992 |
|---|---|---|
| JP | H0493566 A  * | 4/1992 |

(Continued)

OTHER PUBLICATIONS

European Search Report of corresponding EP Application No. 19 944 960.4 dated May 10, 2023.

(Continued)

*Primary Examiner* — Frantz F Jules
*Assistant Examiner* — Martha Tadesse
(74) *Attorney, Agent, or Firm* — Global IP Counselors, LLP (57) ABSTRACT

A refrigerant quality control system indicates quality information of a recovered refrigerant. The refrigerant quality control system includes a CPU and a storage. The CPU is configured to acquire first information related to a quality of the recovered refrigerant from a first information terminal possessed by a provider of the recovered refrigerant via a communication network. The storage stores the first information acquired by the CPU. The CPU is further configured to provide a second information terminal with second information based on the first information stored in the storage via the communication network. The second information (Continued)

terminal is possessed by an entity different from the provider.

13 Claims, 6 Drawing Sheets

(56)  References Cited

FOREIGN PATENT DOCUMENTS

| | | |
|---|---|---|
| JP | 5048554 B2 | 7/2012 |
| JP | 2015125672 A * | 7/2015 |
| JP | 3222921 U | 8/2019 |
| WO | 2019111877 A1 | 6/2019 |

OTHER PUBLICATIONS

International Search Report of corresponding PCT Application No. PCT/JP2019/035677 dated Nov. 19, 2019.
International Preliminary Report of corresponding PCT Application No. PCT/JP2020/035677 dated Mar. 24, 2022.

* cited by examiner

REFRIGERANT QUALITY CONTROL SYSTEM AND REFRIGERANT QUALITY CONTROL METHOD

CROSS-REFERENCE TO RELATED APPLICATIONS

This is a continuation of International Application No. PCT/JP2019/035677 filed on Sep. 11, 2019. The entire disclosures of these applications are incorporated by reference herein.

BACKGROUND

Field of Invention

The present disclosure relates to a refrigerant quality control system and a refrigerant quality control method.

Background Information

Used chlorofluorocarbon has been conventionally collected to be separated from impurities such as refrigerating machine oil for reuse (for example, see JP 5048554 B2). Furthermore, there have been increasing needs for chlorofluorocarbon gas reuse along with stricter regulations of chlorofluorocarbon gas use.

SUMMARY

A refrigerant quality control system according to a first aspect indicates quality information of a recovered refrigerant. The refrigerant quality control system includes a CPU and a storage. The CPU is configured to acquire first information related to a quality of the recovered refrigerant from a first information terminal possessed by a provider of the recovered refrigerant via a communication network. The storage stores the first information acquired by the CPU. The CPU is further configured to provide a second information terminal with second information based on the first information stored in the storage via the communication network. The second information terminal is possessed by an entity different from the provider.

DETAILED DESCRIPTION OF EMBODIMENT(S)

Embodiment (1) Recovery, Regeneration, and Reuse of Refrigerant

Figure 1:
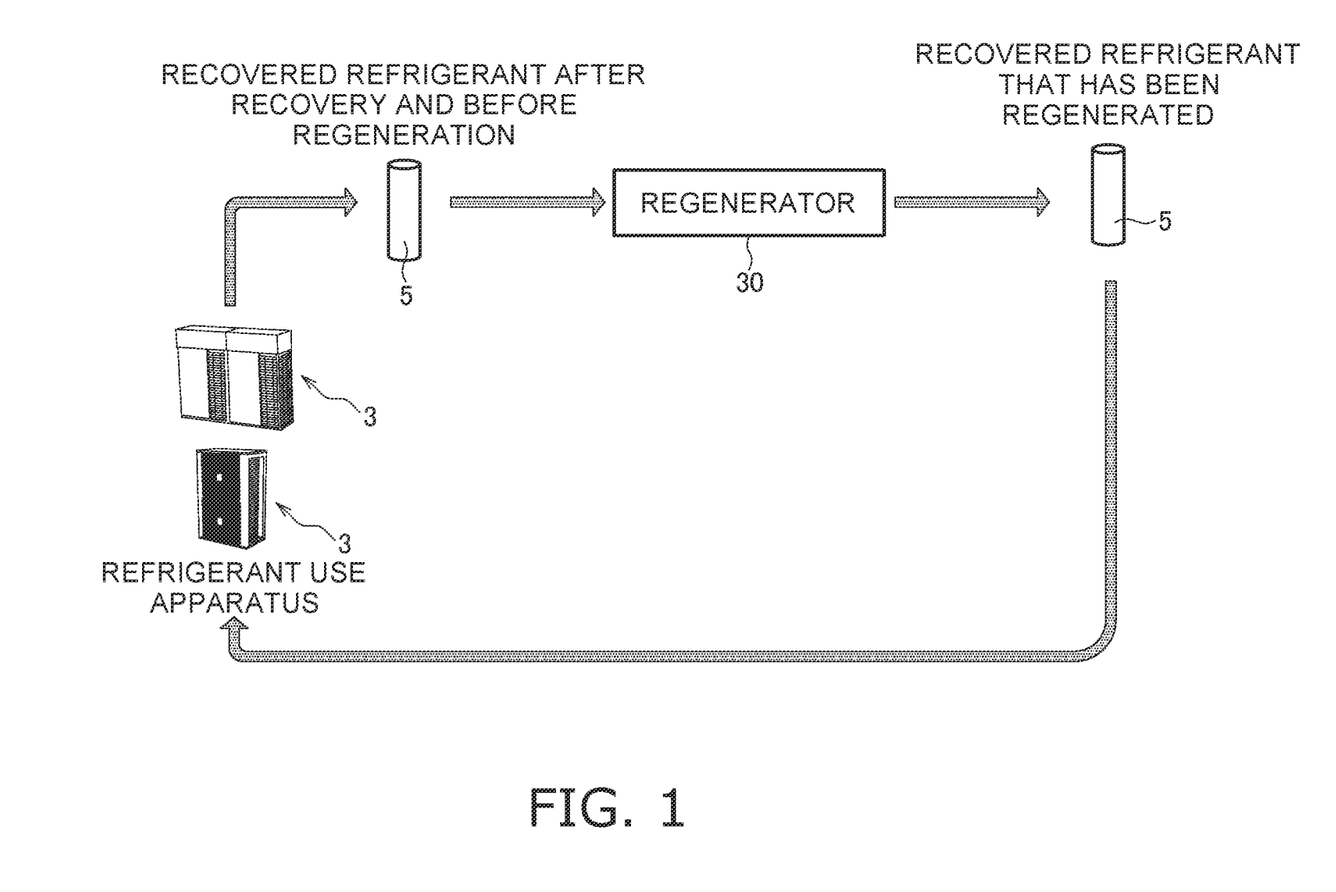
FIG. 1 is a schematic explanatory diagram of recovery, regeneration, and reuse of a refrigerant.

FIG. 1 is a schematic explanatory diagram of recovery, regeneration, and reuse of a refrigerant.

In general, after a refrigerant use apparatus 3 using a chlorofluorocarbon gas as a refrigerant is put on a market, and the refrigerant use apparatus 3 is used, a working fluid including a refrigerant used in the refrigerant use apparatus 3 is recovered in a cylinder 5 when the refrigerant use apparatus 3 is removed, the refrigerant used in the refrigerant use apparatus 3 is renewed, or the like. Examples of the refrigerant use apparatus 3 include a refrigerant cycle apparatus such as an air conditioner that circulates a refrigerant to perform a refrigeration cycle. The working fluid including the refrigerant recovered in the cylinder 5 may be regenerated by a regenerator 30 or discarded by being destroyed at a chemical plant or the like. For example, the working fluid including an HCFC refrigerant is destroyed in a chemical plant or the like without being regenerated. The refrigerant regenerated by the regenerator 30 is reused in a refrigerant use apparatus 3 identical to or different from the refrigerant use apparatus 3 described above.

Here, the working fluid including the refrigerant recovered from the refrigerant use apparatus 3 is referred to as a "recovered refrigerant". A concept of the recovered refrigerant includes a concept of a "regenerated refrigerant" obtained by regenerating a recovered working fluid and a concept of a "non-regenerated refrigerant" as a recovered working fluid having not been regenerated. In regeneration processing, at least processing of reducing or removing oil such as refrigerating machine oil from the working fluid is performed. Further, in the regeneration processing, processing of reducing or removing water from the working fluid and/or processing of reducing or removing acid may be performed. Furthermore, in the regeneration processing, when a blending balance of components in the working fluid does not satisfy a predetermined condition, the components may be adjusted by adding for a shortage and balancing the blend. When the recovered working fluid is a mixture of a plurality of types of HFC refrigerants, a distillation treatment may be performed in the regeneration processing. Contents of the regeneration processing can be selectively performed in accordance with a quality such as a degree of deterioration and an amount of impurities recognized by inspection and analysis.

Examples of the refrigerating machine oil that is included in the working fluid and is to be reduced or removed include ester-based refrigerating machine oil and ether-based refrigerating machine oil. By reducing or removing the refrigerating machine oil deteriorated by use of the working fluid, lubrication performance of devices included in the refrigerant use apparatus 3 can be improved when the refrigerant is used in the refrigerant use apparatus 3, and a concentration of impurity generated from the deteriorated refrigerating machine oil can be reduced.

Further, by reducing or removing water and acid in the regeneration processing, it is possible to suppress occurrence of corrosion in constituent elements of a refrigerant circuit in the refrigerant use apparatus 3.

(2) Electronic Commerce System for Regenerated Refrigerant

Figure 2:
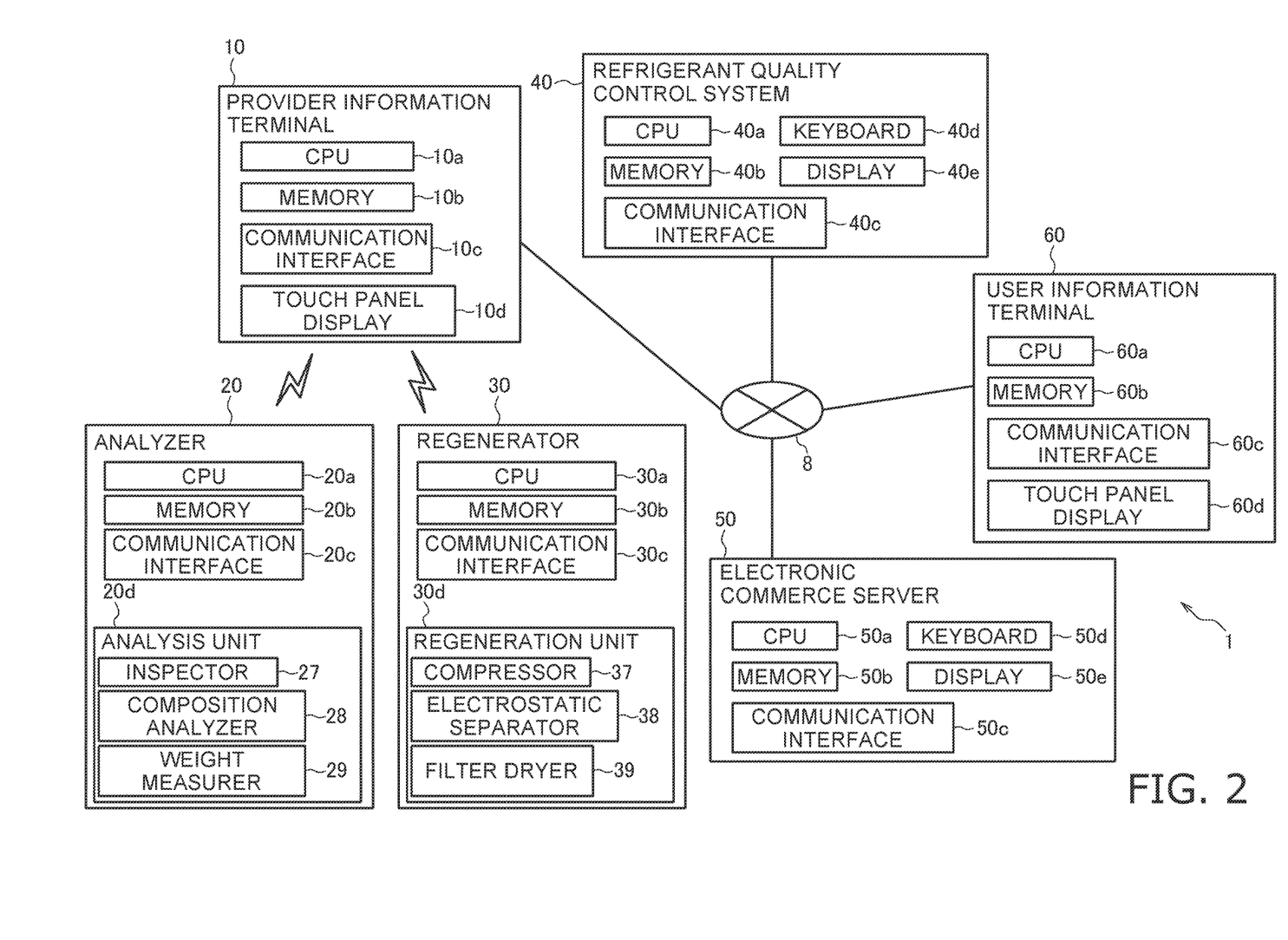
FIG. 2 is a schematic configuration diagram of hardware.
Figure 3:
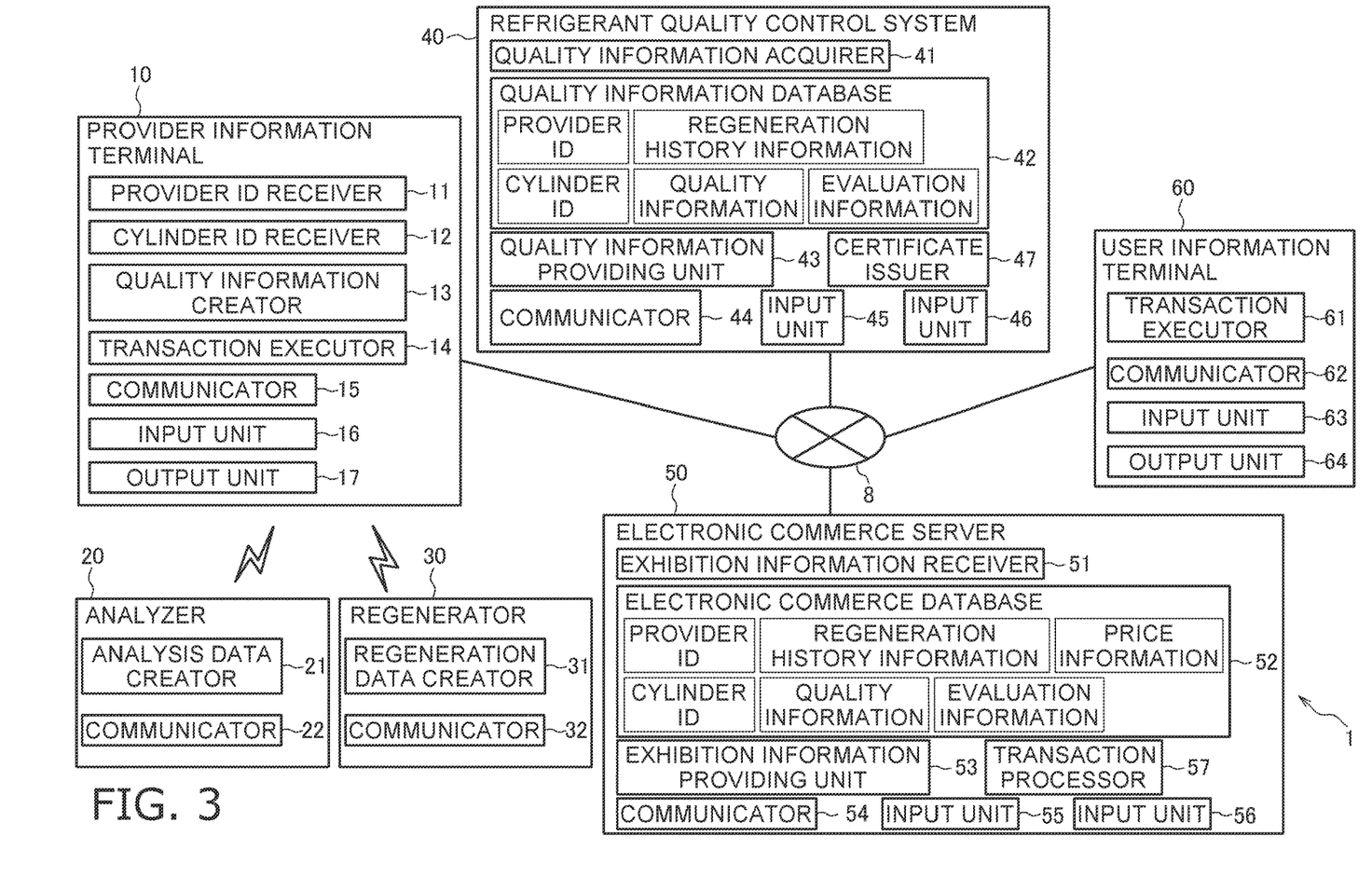
FIG. 3 is a functional block configuration diagram.

An electronic commerce system 1 of recovered refrigerant for promoting reuse of the recovered refrigerant obtained as described above will be described below. FIG. 2 is a schematic configuration diagram of hardware of an overall configuration including the electronic commerce system 1. FIG. 3 is a functional block configuration diagram of the overall configuration including the electronic commerce system 1.

The electronic commerce system 1 for regenerated refrigerant is configured by connecting, communicably via an internet 8, a provider information terminal 10 possessed by a provider who provides a recovered refrigerant, a user information terminal 60 possessed by a user who wishes to purchase the recovered refrigerant (an example of an entity different from the provider), a refrigerant quality control system 40 that controls a quality of the provided recovered refrigerant, and an electronic commerce server 50 that provides a trading market on the internet 8 for conducting electronic commerce.

In the electronic commerce system 1 for recovered refrigerant, the provider exhibits the recovered refrigerant (which may be a regenerated refrigerant or a non-regenerated refrigerant) for sale on an electronic commerce market together with quality information to enable the user to purchase a recovered refrigerant having a desired quality.

Here, the provider presents the quality information of the recovered refrigerant together with information that identifies the cylinder 5 that encloses the recovered refrigerant. The quality information of the recovered refrigerant is quality information recognized by using an analyzer 20 when the provider intends to exhibit a non-regenerated refrigerant for sale, and quality information recognized by using a regenerator 30 when the provider intends to exhibit a regenerated refrigerant for sale.

When a user who has purchased a recovered refrigerant through electronic commerce purchases a recovered refrigerant that has not yet been regenerated, the user entrusts the regeneration processing to a regeneration processing company before obtaining and reusing a regenerated refrigerant. On the other hand, a user who has purchased a regenerated refrigerant through electronic commerce can reuse the regenerated refrigerant as it is.

(3) Analyzer

The analyzer 20 is an apparatus that analyzes and inspects the recovered working fluid, and mainly includes an analysis unit 20*d*, a CPU 20*a*, a memory 20*b*, a communication interface 20*c*, and the like.

The analysis unit 20*d* includes an inspector 27, a composition analyzer 28, and a weight measurer 29.

The inspector 27 inspects whether or not each amount of oil, water, and acid such as refrigerating machine oil included in the recovered working fluid is appropriate. The inspector 27 may be provided with an inspection sheet that is changed in color upon contact with a refrigerant and may inspect with use of the inspection sheet. The inspector 27 may further inspect a degree of deterioration of oil such as refrigerating machine oil included in the recovered working fluid. These inspections can be performed using known techniques.

The composition analyzer 28 analyzes a composition of the refrigerant included in the working fluid. The composition analyzer 28 also has a function of printing and outputting a result of analysis on a receipt or the like. Specifically, the composition analyzer 28 preferably specifies the type of the refrigerant included in the working fluid.

The weight measurer 29 measures a weight of the recovered working fluid.

The memory 20*b* includes ROM and RAM, and stores a program for driving the inspector 27, the composition analyzer 28, and the weight measurer 29, and a program for performing information processing by wireless communication with the provider information terminal 10 described later, and the like.

The CPU 20*a* reads and executes the programs stored in the memory 20*b*.

The communication interface 20*c* is for wireless communication by Bluetooth (registered trademark) or the like with the provider information terminal 10 described later.

In the analyzer 20, the analysis unit 20*d*, the CPU 20*a*, the memory 20*b*, the hardware such as the communication interface 20*c*, and the programs organically cooperate with each other to form functions such as an analysis data creator 21 and a communicator 22.

The communicator 22 receives a provider ID information and a cylinder ID information transmitted by wireless communication from the provider information terminal 10.

The analysis data creator 21 executes inspection processing and analysis processing by the inspector 27, the composition analyzer 28, and the weight measurer 29, and creates analysis data that is a data in association with the provider ID information and the cylinder ID information received from the provider information terminal 10, the analysis data including the quality information such as information on appropriateness of oil, water, and acid in the recovered refrigerant recognized from an inspection result and an analysis result, information on the refrigerant composition of the recovered refrigerant, and information on the weight of the recovered refrigerant.

The communicator 22 performs transmission processing of transmitting the analysis data created by the analysis data creator 21 to the provider information terminal 10 by wireless communication.

(4) Regenerator

The regenerator 30 is an apparatus that regenerates the recovered working fluid, and includes a regeneration unit 30*d*, a CPU 30*a*, a memory 30*b*, a communication interface 30*c*, and the like.

The regeneration unit 30*d* includes a refrigerant circuit provided with a compressor 37, an electrostatic separator 38, a filter dryer 39, and the like. The electrostatic separator 38 is a type of oil separator. While the compressor 37 is driven to circulate the recovered working fluid in the refrigerant circuit, a voltage is applied to reduce or remove oil such as the refrigerating machine oil in the working fluid. The filter dryer 39 reduces or removes water and acid included in the working fluid circulating in the refrigerant circuit. The regeneration unit 30*d* includes a similar device and function to the analysis unit 20*d*, and the information on the appropriateness of the oil, water, and acid included in the working fluid after the regeneration processing, the refrigerant composition, the weight, and the like can be recognized.

The memory 30*b* includes ROM and RAM, and stores a program for performing the regeneration processing by the regeneration unit 30*d* and a program for performing the information processing by wireless communication with the provider information terminal 10 described later.

The CPU 30*a* reads and executes the programs stored in the memory 30*b*.

The communication interface 30*c* is for wireless communication by Bluetooth (registered trademark) or the like with the provider information terminal 10 described later.

In the regenerator 30, the regeneration unit 30*d*, the CPU 30*a*, the memory 30*b*, the hardware such as the communication interface 30*c*, and the programs organically cooperate with each other to form functions such as a regeneration data creator 31 and a communicator 32.

The communicator 32 receives a provider ID information and a cylinder ID information transmitted by wireless communication from the provider information terminal 10.

The regeneration data creator 31 executes the regeneration processing in the regeneration unit 30*d*, and creates regeneration data that is data in association with the provider ID information and the cylinder ID information received from the provider information terminal 10, the regeneration data including the quality information (information on the appropriateness of oil, moisture, and acid in the regenerated refrigerant, information on the refrigerant composition of the regenerated refrigerant, and information on the weight of the regenerated refrigerant) and information indicating that the regenerated refrigerant has been regenerated.

The communicator 32 performs transmission processing of transmitting the regeneration data created by the regeneration data creator 31 to the provider information terminal 10 by wireless communication.

(5) Provider Information Terminal

The provider information terminal 10 is an information terminal possessed by a provider who intends to provide the market with the recovered refrigerant recovered from an existing facility, and may be, for example, a known smartphone or the like.

The provider information terminal 10 includes a CPU 10a, a memory 10b, a communication interface 10c, a touch panel display 10d, and the like.

The memory 10b includes ROM and RAM, and stores a program for receiving a provider ID and a cylinder ID from a provider, a program for creating a program based on the quality information transmitted from the analyzer 20 and the regenerator 30, a program for conducting electronic commerce in the electronic commerce system 1, a program for performing information processing by wireless communication with the analyzer 20 and the regenerator 30, a program for processing web information obtained via the internet 8, and the like.

In the present embodiment, in the program for creating the quality information based on the information transmitted from the analyzer 20 and the regenerator 30, processing is performed to prohibit tampering of the information transmitted from the analyzer 20 and the regenerator 30 in the provider information terminal 10 or record a history of tampering. This can enhance reliability of commerce.

The CPU 10a reads and executes the programs stored in the memory 10b.

The communication interface 10c includes an interface for wireless communication with the analyzer 20 and the regenerator 30 by Bluetooth (registered trademark) and the like and an interface for communication via the internet 8.

The touch panel display 10d displays and outputs various information and also receives information from the provider by touch operation by the provider.

In the provider information terminal 10, the CPU 10a, the memory 10b, the communication interface 10c, hardware such as the touch panel display 10d, and the programs organically cooperate with each other to form functions such as a provider ID receiver 11, a cylinder ID receiver 12, a quality information creator 13, a transaction executor 14, a communicator 15, an input unit 16, and an output unit 17.

The provider ID receiver 11 receives the provider ID input from the provider. The provider ID is an ID used in electronic commerce in the electronic commerce system 1. The name of the provider may be used together with or instead of the provider ID.

The cylinder ID receiver 12 receives a cylinder ID as an ID assigned to a cylinder filled with the recovered refrigerant to be exhibited for sale in the electronic commerce system 1 by the provider.

The quality information creator 13 creates information to be registered in the refrigerant quality control system 40 by using the information transmitted from the analyzer 20 and the regenerator 30. Specifically, the quality information creator 13 includes information combining quality information of the recovered refrigerant associated with the provider ID and the cylinder ID (example of first information), and regeneration history information indicating regenerated or non-regenerated (example of the first information), and the like. The quality information of the recovered refrigerant includes information on the appropriateness of oil, water, and acid in the recovered refrigerant, information on the refrigerant composition of the recovered refrigerant, information on the weight of the recovered refrigerant, and the like.

Further, the quality information creator 13 creates information for conducting electronic commerce in the electronic commerce system 1 by using the information transmitted from the analyzer 20 and the regenerator 30. Specifically, the quality information creator 13 creates information combining the quality information of the recovered refrigerant associated with the provider ID and the cylinder ID, the regeneration history information, a desired price, and the like. Here, the provider may trade the regenerated refrigerant obtained by regenerating the recovered working fluid or may trade the non-regenerated refrigerant that has not been regenerated after being recovered. In a transaction of the regenerated refrigerant, information combining the information on the working fluid associated with the provider ID and the cylinder ID and information on a relatively small desired price is created. In a transaction of the non-regenerated refrigerant, information combining the information on the working fluid associated with the provider ID and the cylinder ID, the information indicating that the refrigerant has been regenerated, and information on a relatively high desired price is created. A user who has purchased the regenerated refrigerant uses the regenerated refrigerant as it is, and the user who has purchased the non-regenerated refrigerant performs or requests a processing company to perform the regeneration processing to use the regenerated refrigerant.

The transaction executor 14 uses the information created by the quality information creator 13 to create information necessary for exhibiting for sale in electronic commerce in the electronic commerce system 1 (information on the recovered refrigerant associated with the provider ID and the cylinder ID, and if necessary, the regeneration history information, the quality information, and information on the price). Further, the transaction executor 14 performs processing of outputting and displaying the information on the touch panel display 10d upon receipt of information indicating that the user wishes to purchase from the electronic commerce server 50.

The communicator 15 performs transmission processing and reception processing of information in wireless communication with the analyzer 20 and the regenerator 30. Further, the communicator 15 performs transmission processing and reception processing of information with a target connected via the internet 8. For example, the communicator 15 performs processing of transmitting the information created by the transaction executor 14 to the electronic commerce server 50.

The input unit 16 performs reception processing of information input by the provider by operating the touch panel display 10d. The output unit 17 performs processing of displaying and outputting information obtained by the above various information processing to the touch panel display 10d.

(6) Refrigerant Quality Control System

The refrigerant quality control system 40 provides quality information of the recovered refrigerant exhibited for sale in the electronic commerce in the electronic commerce system 1 based on the information received from the provider information terminal 10 via the internet 8. An administrator of the refrigerant quality control system 40 is a different entity from the provider, the user, or an administrator of the electronic commerce.

The refrigerant quality control system 40 includes a CPU 40*a*, a memory 40*b*, a communication interface 40*c*, a keyboard 40*d*, a display 40*e*, and the like.

The memory 40*b* includes ROM and RAM, and stores a program for receiving information transmitted from the provider information terminal 10 of the provider via the internet 8, a program for constructing a quality information database 42 by storing the quality information of the recovered refrigerant associated with the provider ID and the cylinder ID for each recovered refrigerant, a program for selecting the quality information of the recovered refrigerant associated with the provider ID and cylinder ID from the quality information database 42 in response to a request from the user and presenting the quality information to the user, a program for creating a certificate data indicating that the administrator of the refrigerant quality control system 40 guarantees contents indicated by the selected quality information (regeneration certificate data indicating that the regenerated refrigerant is a refrigerant that has been further regenerated), a program for performing information processing by communication via the internet 8 with the provider information terminal 10 and the user information terminal 60, and also the quality information database 42.

The CPU 40*a* reads and executes the programs stored in the memory 40*b*.

The communication interface 40*c* is for communication with the provider information terminal 10 and the user information terminal 60 via the internet 8.

The keyboard 40*d* is for the administrator of the refrigerant quality control system 40 to manually input information to the refrigerant quality control system 40.

The display 40*e* displays and outputs various information processed by the CPU 40*a*.

In the refrigerant quality control system 40, the CPU 40*a*, the memory 40*b*, the communication interface 40*c*, the keyboard 40*d*, hardware such as the display 40*e*, and the programs organically collaborate with each other to form functions such as a quality information acquirer 41, a quality information providing unit 43, a certificate issuer 47, a communicator 44, an input unit 45, and an output unit 46, and a quality information database 42.

The quality information acquirer 41 (e.g., the CPU of the refrigerant quality control system 40) receives information transmitted from the provider information terminal 10 of the provider via the internet 8. Then, the quality information database 42 captures and stores the information received by the quality information acquirer 41. Specifically, the quality information acquirer 41 performs processing of receiving the quality information of the non-regenerated refrigerant (example of the first information) associated with the provider ID and the cylinder ID, and the quality information of the regenerated refrigerant (example of the first information) associated with the provider ID and the cylinder ID and to which the regeneration history information (example of the first information) is attached while maintaining the association, and the quality information database 42 performs processing of storing the information maintaining the association. Specifically, the quality information database 42 stores the information on the appropriateness of oil, water, and acid, information on the refrigerant composition, information on the weight, the regeneration history information, and the like for each recovered refrigerant in association with the provider ID and the cylinder ID. When the transaction of the recovered refrigerant is completed, the quality information acquirer 41 receives evaluation information by the user of the transaction of the recovered refrigerant from the transaction executor 61 of the user information terminal 60 possessed by the user (example of the first information) via the internet 8, and the quality information database 42 performs processing of storing the evaluation information in association with the provider ID of the provider who has exhibited the recovered refrigerant for sale. Since the refrigerant quality control system 40 handles the evaluation information in the transaction of the provider who exhibits the recovered refrigerant for sale, it is possible to show the reliability of the quality of the recovered refrigerant sold by the provider to the user.

The quality information providing unit 43 (e.g., the CPU of the refrigerant quality control system 40) performs processing of transmitting various information to the user information terminal 60 in response to an information request received from the user information terminal 60 possessed by the user via the internet 8. Specifically, upon receipt of information (for example, information such as the cylinder ID) of an object that the user who has referred to a web page of the electronic commerce in the electronic commerce system 1 is considering purchasing from the user information terminal 60 via the internet 8, the quality information providing unit 43 performs processing of searching information such as the quality information, the regeneration history information, and the provider ID of the object from the quality information database 42, and creating information to be returned to the user information terminal 60 via the internet 8. The information returned to the user information terminal 60 (example of the second information) includes information on the appropriateness of oil, water, and acid of the target recovered refrigerant, information on the refrigerant composition, information on the weight, the regeneration history information, the evaluation information, and the like.

The certificate issuer 47 performs processing of creating the certificate data indicating that the administrator of the refrigerant quality control system 40 guarantees the content indicated by the quality information purchased by the user in response to a certificate issuance request received from the user information terminal 60. The certificate data further includes the regeneration certificate data as information indicating that the regenerated refrigerant is a refrigerant having been regenerated. The information indicating that the refrigerant is regenerated may include, for example, certification information indicating that the administrator of the refrigerant quality control system 40 guarantees the quality information of the refrigerant, may include certification information indicating that a public organization guarantees the quality information of the refrigerant, and may include the evaluation information of the provider as a seller of the recovered refrigerant in the transaction.

The communicator 44 performs transmission processing and reception processing of information in communication via the internet 8 with the provider information terminal 10 and the user information terminal 60.

The input unit 45 performs reception processing of the information input by the administrator of the refrigerant quality control system 40 by operating the keyboard 40*d*. The output unit 46 performs processing of displaying and outputting the information obtained by the above various information processing to the display 40*e*.

Figure 4:
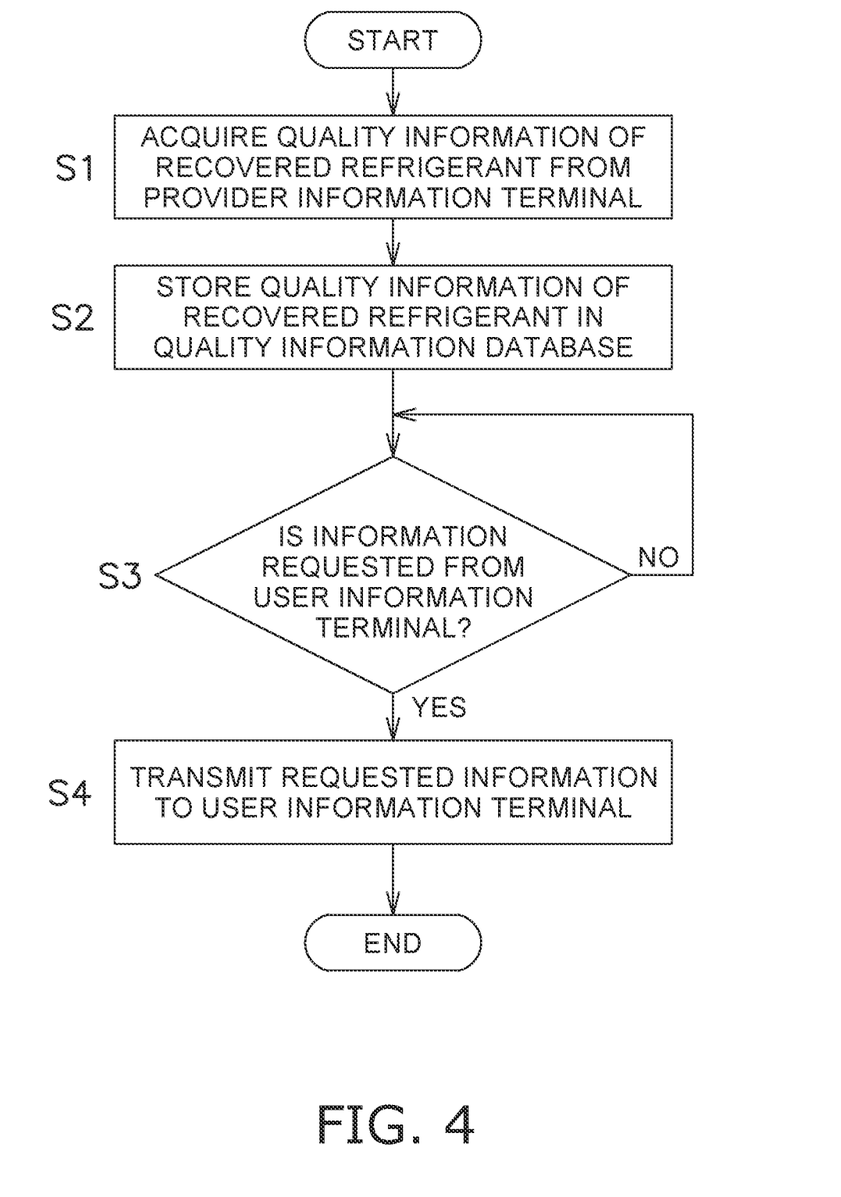
FIG. 4 is a flowchart of processing of a refrigerant quality control system.

FIG. 4 is a flowchart of a part of the processing performed by the refrigerant quality control system 40 having the above configuration.

In the refrigerant quality control system 40, first, in step S1, the quality information acquirer 41 acquires the quality information and the like of the recovered refrigerant associated with the cylinder ID and the provider ID from the provider information terminal 10 via the internet 8.

Next, in step S2, the quality information database 42 captures and stores the information acquired by the quality information acquirer 41. Specifically, the quality information database 42 stores the quality information of the recovered refrigerant and in an associated manner with the cylinder ID and the provider ID.

In step S3, the quality information providing unit 43 determines presence or absence of an information request from the user information terminal 60 via the internet 8. Specifically, the quality information providing unit 43 determines whether or not a request for the quality information or the like specifying the cylinder ID from the user information terminal 60 has been received. When the request has been received, the processing proceeds to step S4, and when the request has not been received, step S3 is repeated.

In step S4, the quality information providing unit 43 reads the quality information and the like associated with the cylinder ID requested from the user information terminal 60 from the quality information database 42, and transmits the quality information and the like to the user information terminal 60 via the internet 8.

Through the above processing, the user can know the quality information and the like of the recovered refrigerant exhibited for sale by the provider.

(7) Electronic Commerce Server

The electronic commerce server 50 administers the transaction of the recovered refrigerant to be exhibited for sale in the electronic commerce in the electronic commerce system 1 based on the information received from the provider information terminal 10 via the internet 8.

The electronic commerce server 50 includes a CPU 50a, a memory 50b, a communication interface 50c, a keyboard 50d, a display 50c, and the like.

The memory 50b includes ROM and RAM, and stores a program for performing processing of receiving information related to an exhibit of recovered refrigerant transmitted from the provider information terminal 10 of the provider via the internet 8 (arbitrary information from the seller including the provider ID, the cylinder ID, the quality information of the recovered refrigerant, and the price), a program for performing processing for constructing an electronic commerce database 52 by storing the information received from the provider information terminal 10 of the provider for each recovered refrigerant, a program for selecting information stored in association with a specific cylinder ID or provider ID from the electronic commerce database 52 in response to a request from the user and providing a web page according to the acquired information in a specific URL, a program for performing information processing by communication with the provider information terminal 10 and the user information terminal 60 via the internet 8, and also the electronic commerce database 52.

The CPU 50a reads and executes the programs stored in the memory 40b.

The communication interface 50c is for communication with the provider information terminal 10 and the user information terminal 60 via the internet 8.

The keyboard 50d is for an administrator of the electronic commerce server 50 to manually input information to the electronic commerce server 50.

The display 50e displays and outputs various information processed by the CPU 50a.

In the electronic commerce server 50, the CPU 50a, a memory 50b, the communication interface 50c, the keyboard 50d, and hardware such as the display 50e and programs organically cooperate with each other to form functions such as an exhibition information receiver 51, an exhibition information providing unit 53, a transaction processor 57, a communicator 54, an input unit 55, an output unit 56, and an electronic commerce database 52.

The exhibition information receiver 51 receives information transmitted from the provider information terminal 10 of the provider (information on the recovered refrigerant to be exhibited for sale in the electronic commerce) via the internet 8. Then, the electronic commerce database 52 captures and stores the information received by the exhibition information receiver 51. Specifically, the exhibition information receiver 51 performs processing of receiving the quality information of the non-regenerated refrigerant associated with the provider ID and the cylinder ID, the quality information of the regenerated refrigerant associated with the provider ID and the cylinder ID and to which the regeneration history information is attached, and information such as the price provided by the provider, and the electronic commerce database 52 performs processing of storing such information.

The exhibition information providing unit 53 performs processing of transmitting various information to the user information terminal 60 in response to an information request received from the user information terminal 60 possessed by the user via the internet 8. Specifically, upon receipt of information indicating conditions of an object that the user who has referred to the web page of the electronic commerce in the electronic commerce system 1 is considering purchasing (for example, conditions such as the type and quality of the recovered refrigerant, the weight, and the presence or absence of regeneration processing) from the user information terminal 60 via the internet 8, the exhibition information providing unit 53 performs processing of searching information such as the quality information, the regeneration history information, the provider ID, and the price of the object from the electronic commerce database 52 and creating information to be returned to the user information terminal 60 via the internet 8.

Upon receipt of information on a wish for purchase of the recovered refrigerant of a specific cylinder ID from the user information terminal 60, the transaction processor 57 transmits the information indicating the wish for purchase together with information identifying the user to the provider information terminal 10 possessed by the provider associated with the cylinder ID. Upon receipt of information for evaluating the provider by the transaction from the user information terminal 60, the transaction processor 57 updates the evaluation information stored in the electronic commerce database 52 in association with the provider ID in accordance with the evaluated information. Upon receipt of a request for viewing past evaluation history information of the provider of the specific provider ID from the user information terminal 60, the transaction processor 57 performs processing of identifying the evaluation history information stored in association with the provider ID and returning the evaluation history information to the user information terminal 60. Further, upon receipt of the information related to a completion of the transaction from the provider information terminal 10 or the information for evaluating the provider, the transaction processor 57 changes a status of the recovered refrigerant of the cylinder ID in the electronic commerce database 52 from on sale to transaction completed.

The communicator 54 performs transmission processing and reception processing of information in communication via the internet 8 with the provider information terminal 10 and the user information terminal 60.

The input unit 55 performs reception processing of the information input by the administrator of the electronic commerce server 50 by operating the keyboard 50*d*. The output unit 56 performs processing of displaying and outputting the information obtained by the above various information processing to the display 50*c*.

Figure 5:
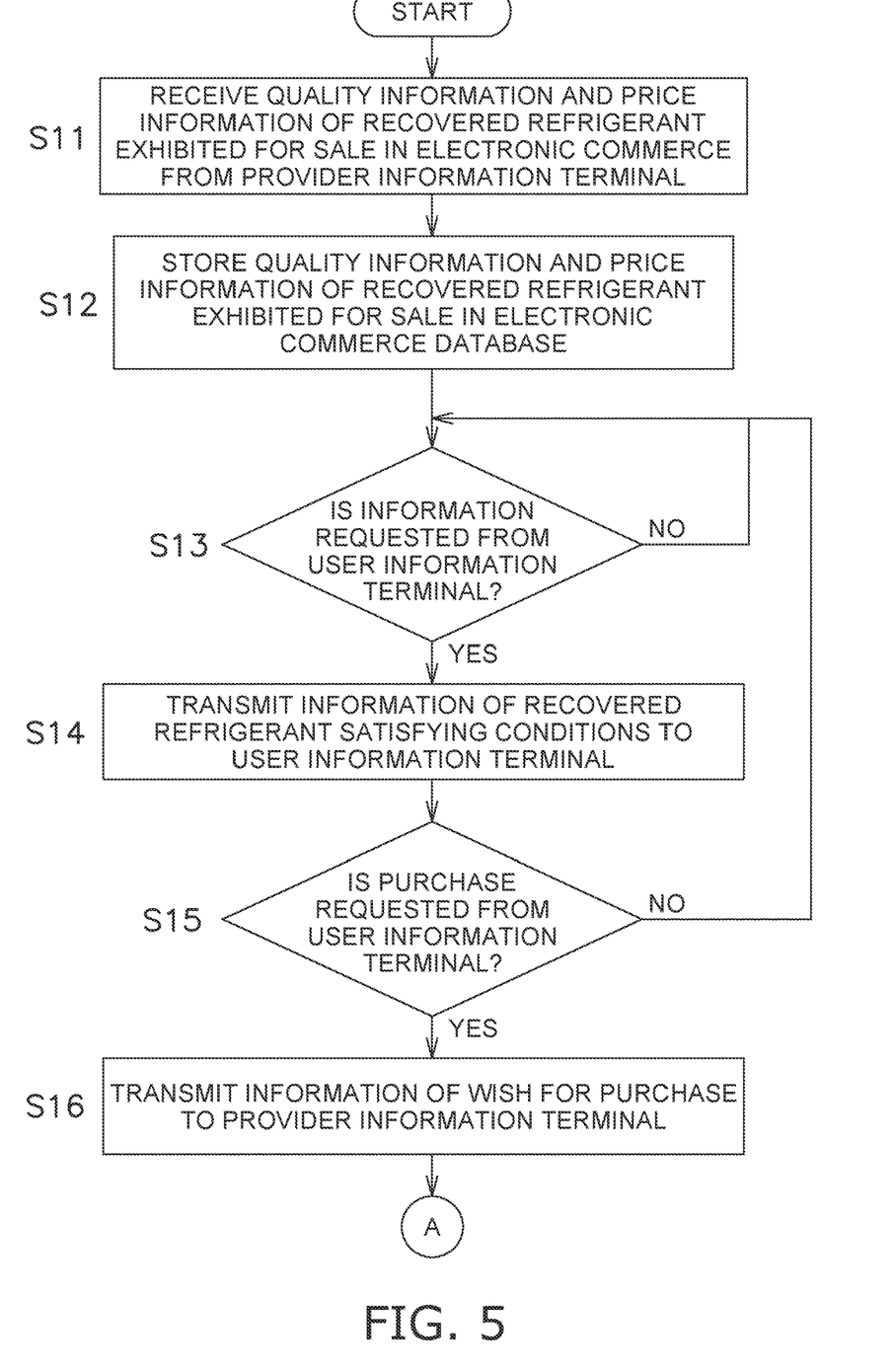
FIG. 5 is a flowchart (1) of processing of an electronic commerce server.
Figure 6:
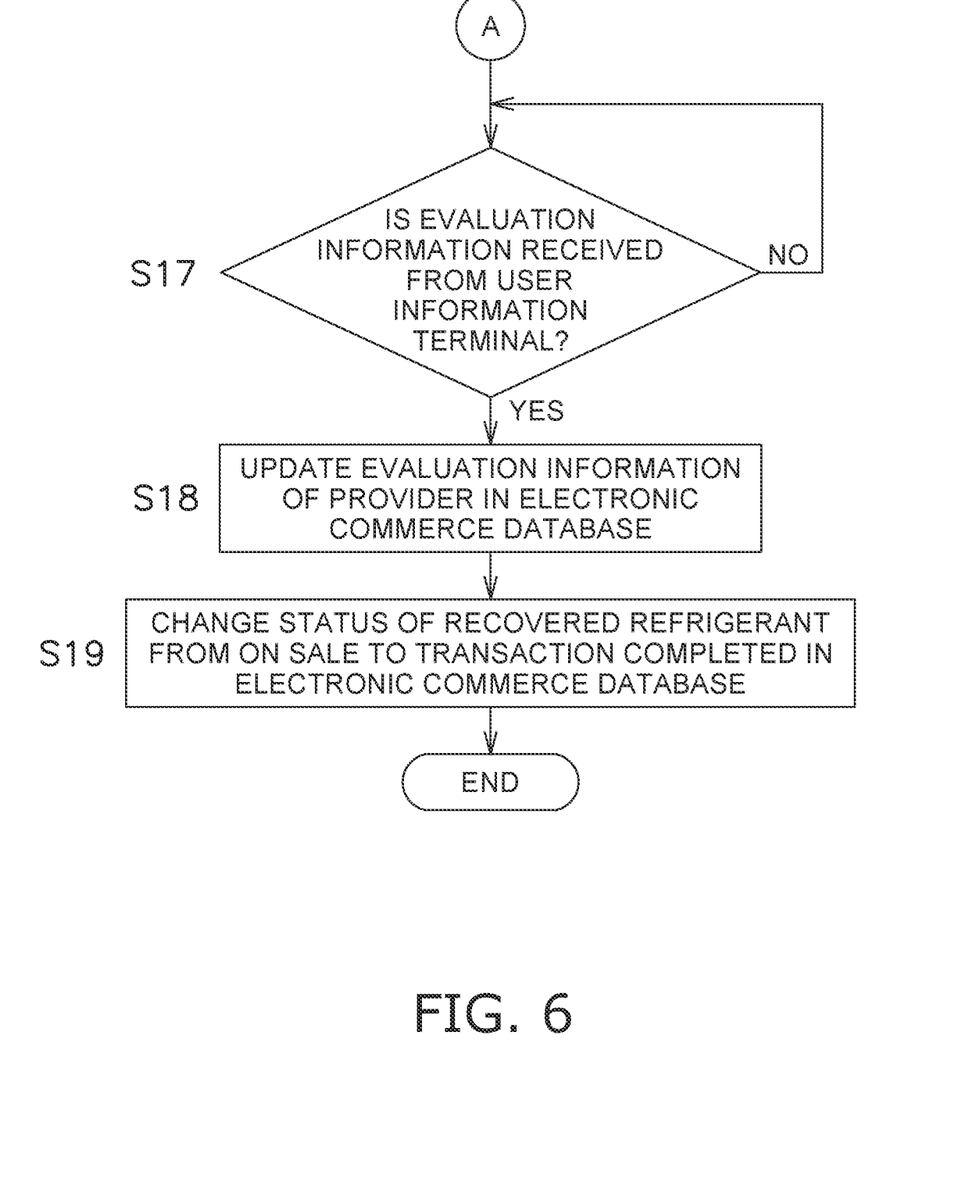
FIG. 6 is a flowchart (2) of processing of the electronic commerce server.

FIGS. 5 and 6 are flowcharts of a part of the processing performed by the electronic commerce server 50 having the above configuration.

In the electronic commerce server 50, first, in step S11, the exhibition information receiver 51 receives information and the like on the recovered refrigerant to be exhibited for sale in the electronic commerce from the provider information terminal 10 via the internet 8. Specifically, the exhibition information receiver 51 receives the quality information and the like of the recovered refrigerant associated with the cylinder ID and the provider ID, and price information of the recovered refrigerant.

Next, in step S12, the electronic commerce database 52 captures and stores the information received by the exhibition information receiver 51. Specifically, the electronic commerce database 52 stores the quality information and the like of the recovered refrigerant associated with the cylinder ID and the provider ID and the price information of the recovered refrigerant in an associated manner.

In step S13, the exhibition information providing unit 53 determines whether or not an information request has been received from the user information terminal 60 possessed by the user via the internet 8. Specifically, the exhibition information providing unit 53 determines whether or not the conditions of the object that the user is considering purchasing from the user information terminal 60 (for example, the type and quality of the recovered refrigerant, the weight, the presence or absence of regeneration processing, and the like) have been received. When the conditions have been received, the processing proceeds to step S14, and when the conditions have not been received, step S13 is repeated.

In step S14, the exhibition information providing unit 53 reads the object satisfying the conditions of the recovered refrigerant received from the user information terminal 60 from the electronic commerce database 52 and performs processing of creating information to be returned to the user information terminal 60 via the internet 8.

In step S15, the transaction processor 57 determines whether or not a purchase request information has been received from the user information terminal 60 possessed by the user via the internet 8. Specifically, the transaction processor 57 determines whether or not the user information terminal 60 has received the information indicating that the user wishes to purchase the recovered refrigerant of a specific cylinder ID. When the information has been received, the processing proceeds to step S16, and when the information has not been received, the processing returns to step S13.

In step S16, the transaction processor 57 transmits the information indicating the wish for purchase together with information identifying the user to the provider information terminal 10 possessed by the provider of the provider ID associated with the cylinder ID.

In step S17, the transaction processor 57 determines whether or not an evaluation information of the transaction has been received from the user information terminal 60 possessed by the user via the internet 8. Specifically, the transaction processor 57 determines whether or not the evaluation information for evaluating the provider in the transaction of a specific cylinder ID has been received from the user information terminal 60. When the evaluation information has been received, the processing proceeds to step S18, and when the evaluation information has not been received, step S17 is repeated.

In step S18, the transaction processor 57 updates the evaluation information stored in association with the provider ID in the electronic commerce database 52 in accordance with the evaluation information received in step S17.

In step S19, the transaction processor 57 performs processing of changing a status in the electronic commerce database 52 of the recovered refrigerant of the cylinder ID in the transaction of the evaluation received in step S17 from on sale to transaction completed.

Through the above processing, the user can conduct a transaction while recognizing the quality information of the recovered refrigerant and the like via the internet 8.

(8) User Information Terminal

The user information terminal 60 is an information terminal possessed by a user who intends to purchase a desired recovered refrigerant from the recovered refrigerants (including regenerated refrigerants and non-regenerated refrigerants) exhibited for sale by the provider in the electronic commerce in the electronic commerce system 1, and can be, for example, a known smartphone or the like.

The user information terminal 60 includes a CPU 60*a*, a memory 60*b*, a communication interface 60*c*, a touch panel display 60*d*, and the like.

The memory 60*b* includes ROM and RAM, and stores a program for performing electronic commerce in the electronic commerce system 1, a program for processing web information obtained via the internet 8, and the like.

The CPU 60*a* reads and executes the programs stored in the memory 60*b*.

The communication interface 60*c* is for communication via the internet 8.

The touch panel display 60*d* displays and outputs various information and also receives information from the user by touch operation by the user.

In the above user information terminal 60, a CPU 60*a*, a memory 60*b*, a communication interface 60*c*, hardware such as a touch panel display 60*d*, and the programs organically cooperate with each other to form function such as a transaction executor 61, a communicator 62, an input unit 63, and an output unit 64.

The transaction executor 61 performs various information processing for supporting the purchase of the recovered refrigerant exhibited for sale in the electronic commerce in the electronic commerce system 1. Specifically, the transaction executor 61 generates a request signal for presenting a recovered refrigerant according to the conditions input by the user (information on the recovered refrigerant of a specific cylinder ID, past evaluation history information of a specific provider ID, and the like) from among the recovered refrigerants (including regenerated refrigerants and non-regenerated refrigerants) exhibited for sale in the electronic commerce of the electronic commerce system 1, and accesses a web page of a specific URL provided by the electronic commerce server 50. The transaction executor 61 creates a purchase request signal indicating a wish for purchasing the recovered refrigerant having a specific cylinder ID in accordance with input information from the user. The transaction executor 61 receives the evaluation of the provider by the user at the time of conducting the transaction, and creates information to transmit to the electronic commerce server 50 and the refrigerant quality control system 40 based on the received information. Further, the transaction executor 61 creates a signal requesting the refrigerant quality control system 40 for certificate data, and performs processing of outputting the certificate data received from the refrigerant quality control system 40.

Further, the communicator 62 performs transmission processing and reception processing of information with a target connected via the internet 8. For example, the communicator 62 performs processing of transmitting the above various signals to the electronic commerce server 50.

The input unit 63 performs reception processing of information input by the user by operating the touch panel display 60d. The output unit 64 performs processing of displaying and outputting information obtained by the above various information processing to the touch panel display 60d.

(9) Characteristics of Embodiment

In the refrigerant quality control system 40, the user can easily know the quality information of the recovered refrigerant provided by the provider via the internet 8 by using the cylinder ID assigned to the cylinder 5. It is therefore possible to promote the purchase of the recovered refrigerant by the user and promote the reuse of the recovered refrigerant.

Here, it is possible to prove that the recovered refrigerant (regenerated refrigerant) of the cylinder ID associated with the regeneration history information has been regenerated. Specifically, the regeneration history information can be functioned as a regeneration certificate. Thus, the user can purchase a regenerated product without anxiety.

In addition, the user can obtain a certificate issued by the refrigerant quality control system 40 for the recovered refrigerant. Accordingly, the user can indicate that the refrigerant used by the user is a refrigerant guaranteed by the refrigerant quality control system 40. For example, a user who has purchased a regenerated refrigerant can indicate that the refrigerant used by the user is a regenerated refrigerant. As a result, for example, even when an emission amount of Freon refrigerant is restricted by legal regulations, a refrigerant user company can prove that the refrigerant user company uses a refrigerant with a regeneration certificate, and that the emission amount of Freon refrigerant is small. In particular, in the embodiment, analysis data acquired from the analyzer 20 and regeneration data acquired from the regenerator 30 by the provider information terminal 10 are prohibited from being tampered with in the provider information terminal 10, or a history of tampering is recorded when the analysis data or the regeneration data is tampered with. Therefore, the certificate issued by the refrigerant quality control system 40, which handles the data acquired from the provider information terminal 10, can secure reliability.

Since the provider receives an evaluation from the user for each transaction, the reliability of the information provided by the provider can be improved, and a recovered refrigerant of a quality that is difficult for regeneration and use can be prevented from being a target of a transaction.

(10) Modifications (10-1) Modification A

In the embodiment, a case has been exemplarily described in which the refrigerant quality control system 40 issues a certificate as a regenerated refrigerant for a recovered refrigerant having been regenerated in the regenerator 30.

Alternatively, for example, the refrigerant quality control system 40 may determine whether or not the regenerated refrigerant having been regenerated in the regenerator 30 meets a predetermined standard, and may issue a certificate as a regenerated refrigerant for only a regenerated refrigerant that satisfies the predetermined standard.

The predetermined standard is not limited. For example, the working fluid after regeneration may include water of a predetermined value or less, evaporation residue of a predetermined value or less, acid of a predetermined value or less, and the predetermined standard may be a standard that complies with AHR1700 in the United States as a regulation that establishes quality standards.

(10-2) Modification B

In the embodiment, a case has been exemplarily described in which the analysis data and the regeneration data acquired from the analyzer 20 and the regenerator 30 by wireless communication are transmitted to each target via the provider information terminal 10 and the internet 8.

Alternatively, the analysis data and the regeneration data may be manually input to the provider information terminal 10 by the provider who has seen the analysis data and the regeneration data acquired from the analyzer 20 and the regenerator 30. In this case, there is a risk that the information may be tampered with or an input error may occur when the provider manually inputs the information to the provider information terminal 10. Therefore, in order to improve the reliability of the evaluation, the analysis data and the regeneration data are preferably not changed substantially, as in the embodiment.

(10-3) Modification C

In the embodiment, a case has been exemplarily described in which the composition information of the refrigerant, oil information, water information, and acid information included in the working fluid, and the like are handled as the analysis data and the regeneration data acquired from the analyzer 20 and the regenerator 30.

On the other hand, as the analysis data and the regeneration data, the information on a weight ratio of non-condensable gas such as oxygen and nitrogen included in the working fluid, the information on a weight ratio of fine particles included in the working fluid, and the like may further be included. Further, as the quality information of the recovered refrigerant, information such as a recovery date and time and a regeneration date and time of the recovered refrigerant, a recovery location, a regeneration facility, an image of the cylinder 5, and an image of the recovered refrigerant may be further included.

(10-4) Modification D

In the embodiment, a case has been exemplarily described in which each of the provider information terminal 10, the analyzer 20, the regenerator 30, the refrigerant quality control system 40, the electronic commerce server 50, and the user information terminal 60 includes a central processing unit (CPU) for performing various information processing.

Alternatively, the processor that performs information processing in each terminal or device is not limited to the CPU, but may be a processor such as a micro-processing unit (MPU), or may be configured by hardware such as a large scale integration (LSI), an application specific integrated circuit (ASIC), or a field-programmable gate array (FPGA).

(10-5) Modification E

In the embodiment, a case has been exemplarily described in which a recovered refrigerant that requires component adjustment is also subject to electronic commerce.

Alternatively, the recovered refrigerant that requires component adjustment requires relatively large-scale regeneration processing and thus may be excluded from electronic commerce. For example, the recovered refrigerant that has acquired a result that the component adjustment is required as a result of inspection and analysis by the analyzer 20 or the like may be configured not to be stored in the electronic commerce database 52 by the electronic commerce server 50 and thus not to be exhibited for sale although data is transmitted from the provider information terminal 10 to the electronic commerce server 50.

(10-6) Modification F

In the above embodiment, a case has been exemplarily described in which the exhibition information receiver 51 of the electronic commerce server 50 receives information transmitted from the provider information terminal 10 of the provider (information on the recovered refrigerant to be exhibited for sale in the electronic commerce) via the internet 8.

Alternatively, an acquisition route of the above information by the electronic commerce server 50 is not limited. For example, the information may be acquired by the exhibition information receiver 51 of the electronic commerce server 50 receiving various information in the quality information database 42 of the refrigerant quality control system 40 via the internet 8.

For example, the provider transmits the cylinder ID and the price information of the recovered refrigerant to be exhibited for sale from the provider information terminal 10 possessed by the provider to the exhibition information receiver 51 of the electronic commerce server 50 via the internet 8. Then, the exhibition information receiver 51 of the electronic commerce server 50 requests the refrigerant quality control system 40 for other information required for the exhibition via the internet 8 while indicating the cylinder ID. Upon receipt of the request, the refrigerant quality control system 40 reads the information stored in association with the cylinder ID from the information in the quality information database 42 and transmits the information to the exhibition information receiver 51 of the electronic commerce server 50 via the internet 8. Through the above processing, the electronic commerce server 50 can acquire similar information to information in the embodiment, and can store similar information to information in the embodiment in the electronic commerce database 52.

(10-7) Modification G

In the embodiment, a case has been exemplarily described in which various information for performing electronic commerce is stored in the electronic commerce database 52 of the electronic commerce server 50.

Alternatively, for example, the electronic commerce server 50 may have no database like the electronic commerce database 52 in the embodiment, and when the electronic commerce server 50 receives an information request from a provider or a user, the electronic commerce server 50 may acquire corresponding information from the quality information database 42 of the refrigerant quality control system 40 via the internet 8. In this case, for example, the refrigerant quality control system 40 acquires the price information from the provider information terminal 10 in advance, and the quality information database 42 further includes the price information desired by the provider for each cylinder ID.

(10-8) Modification H

In the embodiment, a case has been exemplarily described in which there is one refrigerant quality control system 40 and one electronic commerce server 50.

Alternatively, there may be a plurality of systems like the refrigerant quality control system 40 that provide quality information of the recovered refrigerant or guarantee the quality of the recovered refrigerant. For example, there may be a plurality of refrigerant quality control systems 40 (or administrators of the refrigerant quality control systems 40) for each country, and exchange of quality information of recovered refrigerants and transactions of recovered refrigerants may be conducted across national borders. Here, when there are a plurality of refrigerant quality control systems 40, the quality required for the recovered refrigerant may differ for each refrigerant quality control system 40 (for each of the administrators of the refrigerant quality control systems 40), and a level of quality to be guaranteed may be different. Further, each refrigerant quality control system 40 may independently issue guarantee data of the quality of the recovered refrigerant in accordance with the standard adopted by each refrigerant quality control system 40. For example, one refrigerant quality control system may issue guarantee data only when a ratio of oil and water in the recovered refrigerant is less than a first reference value, and another refrigerant quality control system may issue guarantee data only when the ratio of oil and water in the recovered refrigerant is less than a second reference value, which is lower than the first reference value. In this case, the user can use a quality standard guaranteed by each refrigerant quality control system 40 as reference information at the time of purchase.

Further, there may be a plurality of servers like the electronic commerce server 50 that form a market for electronic commerce of recovered refrigerants. For example, there may be a plurality of electronic commerce servers 50 that are operated and managed by different operating entities. In this case, it becomes easier to expand the market in which the recovered refrigerant is traded, and it becomes possible to further promote the reuse of the recovered refrigerant.

(10-9) Other Modifications

Here, the first information and the second information may be exactly the same information, and the second information may be substantially similar information obtained by adding or summarizing information based on the first information. The second information, which is information based on the first information, includes information related to the quality of the recovered refrigerant.

The first information related to the quality of the recovered refrigerant from the provider of the recovered refrigerant is not limited, and may be, for example, information manually input by the provider to the first information terminal, information recognized by an analyzer of the recovered refrigerant, information recognized by a regenerator of the recovered refrigerant, or information obtained by combining the above information.

Further, the recovered refrigerant is a working fluid recovered from an existing refrigerant cycle apparatus, and only needs to include a refrigerant, and may further include impurities such as refrigerating machine oil or water in addition to the refrigerant. The concept of the recovered refrigerant includes a concept of a regenerated refrigerant that has been regenerated and a concept of a non-regenerated refrigerant that has not been regenerated. Examples of regeneration processing include processing of reducing or removing oil such as refrigerating machine oil from the working fluid.

Examples of the entity different from the provider are not limited and include a purchaser of the recovered refrigerant, a viewer of the second information in a hope of purchasing, a mere viewer of the second information, and the like.

The first information terminal possessed by the provider is not limited to an information terminal possessed by the provider, and may be an information terminal operated by the provider. Similarly, the second information terminal possessed by the entity different from the provider is not limited to an information terminal possessed by the entity different from the provider, and may be an information terminal operated by the entity different from the provider.

There may be one or a plurality of providers. There may be a single or a plurality of recovered refrigerants. When there are a plurality of recovered refrigerants, the entity different from the provider can search a recovered refrigerant desired by the entity from the plurality of recovered refrigerants based on the second information of each recovered refrigerant. Further, the entity different from the provider may be one person or a plurality of people.

Examples of the composition information include information indicating a type of refrigerant, information on a compound, information indicating a weight ratio of the compound, and the like. Examples of the oil information include information indicating a type of oil, information indicating a weight ratio of oil in the working fluid, and the like. Examples of the water information include information indicating a weight ratio of water in the working fluid. Examples of the acid information include information indicating a weight ratio of acid in the working fluid. Examples of the non-condensable gas information include information on a weight ratio of non-condensable gas such as oxygen and nitrogen in the working fluid. Examples of the fine particle information include information indicating a weight ratio of fine particles in the working fluid.

This storage may store the first information and/or the second information in association with the information identifying the refrigerant container that encloses the recovered refrigerant.

The information identifying the refrigerant container is not limited, and for example, when a container ID is assigned to each refrigerant container, the container ID can be used as the information.

The information identifying the provider is not limited, and may be, for example, a name of the provider, or when a provider ID is assigned to the provider, the provider ID can be used as the information.

The wireless communication is not limited, and examples of the wireless communication include Bluetooth (registered trademark), infrared communication, and near field communication (NFC).

Although not limited, for example, the first information terminal may be a smartphone, and may be provided with a program for acquiring information recognized by the analyzer or the regenerator by wireless communication.

The regenerator may further include a filter dryer that reduces or removes water.

This refrigerant quality control system may present a recovered refrigerant and information indicating the quality of the recovered refrigerant on, for example, a web page of a specific uniform resource locator (URL), and may be used for the "entity different from the provider" who has accessed the web page by operating the second information terminal or the like to convey an intention of a transaction to the first information terminal of the provider.

In causing a trade of the recovered refrigerant, for example, in a case where the recovered refrigerant and the information indicating the quality of the recovered refrigerant are presented on a web page of a specific uniform resource locator (URL), the "entity different from the provider" who has accessed the web page may be able to operate on the web page to convey an intention of a transaction to the first information terminal of the provider by operating the second information terminal or the like.

OTHER EMBODIMENTS

The embodiments have been described above. Various modifications to modes and details will be available without departing from the object and the scope of the claims.

In other words, the present disclosure is not limited to the embodiment without any change. The present disclosure can be embodied, upon implementation, with any modification to any constituent element within a range not departing from the gist. The present disclosure can be presented in various manners with appropriate combinations of a plurality of constituent elements disclosed in the respective embodiments. For example, some may be excluded from all the constituent elements according to the embodiments. Furthermore, constituent elements according to different embodiments may be combined with each other where appropriate.

The invention claimed is:

1. A refrigerant quality control system that indicates quality information of a recovered refrigerant, the refrigerant quality control system comprising:
a CPU configured to acquire first information related to a quality of the recovered refrigerant from a first information terminal possessed by a provider of the recovered refrigerant via a communication network, the first information being associated with information identifying a refrigerant container that encloses the recovered refrigerant or associated with information identifying the provider of the recovered refrigerant; and
a storage that stores the first information acquired by the CPU,
the CPU being further configured to provide a second information terminal with second information which is the same as the first information stored in the storage via the communication network, the second information terminal being possessed by an entity different from the provider, wherein
the first information includes regenerated refrigerant information including at least one of composition information, oil information, water information, acid information, weight information, related to a regenerated refrigerant, the regenerated refrigerant information including information recognized by a regenerator when the provider regenerates the recovered refrigerant using the regenerator,
the first information terminal is configured to acquire, by wireless communication, the information recognized by the regenerator from the regenerator, and
the CPU is further configured to acquire, via the communication network, the information acquired from the regenerator by the first information terminal.

2. The refrigerant quality control system according to claim 1, wherein
the first information includes at least one of composition information, oil information, water information, acid information, non-condensable gas information, or fine particle information, related to the recovered refrigerant.

3. The refrigerant quality control system according to claim 1, wherein
the storage stores the first information related to the quality of the recovered refrigerant in association with the information identifying the refrigerant container that encloses the recovered refrigerant.

4. The refrigerant quality control system according to claim 1, wherein the storage stores the first information related to the quality of the recovered refrigerant in association with the information identifying the provider.

5. The refrigerant quality control system according to claim 1, wherein
the first information related to the quality of the recovered refrigerant further includes information recognized by an analyzer when the provider analyzes the recovered refrigerant by using the analyzer.

6. The refrigerant quality control system according to claim 5, wherein
the first information terminal is further configured to acquire, by the wireless communication, the information recognized by the analyzer from the analyzer, and
the CPU is further configured to acquire, via the communication network, the information acquired from the analyzer by the first information terminal.

7. The refrigerant quality control system according to claim 5, wherein
the regenerator includes at least an oil separator.

8. The refrigerant quality control system according to claim 1, wherein the recovered refrigerant is the regenerated refrigerant in which oil has been reduced or removed after recovery.

9. The refrigerant quality control system according to claim 1, wherein
the CPU is further configured to
determine whether or not the recovered refrigerant is the regenerated refrigerant based on the first information stored in the storage, and
upon determination that the recovered refrigerant is the regenerated refrigerant, provide the second information terminal with the second information of the recovered refrigerant together with information indicating that the recovered refrigerant is the regenerated refrigerant.

10. The refrigerant quality control system according to claim 1, wherein
the refrigerant quality control system is used to cause a transaction of the recovered refrigerant based on the second information between the provider and an entity different from the provider to be conducted via an internet.

11. A refrigerant quality control method that indicates quality information of a recovered refrigerant, the method comprising:
acquiring, with a CPU, first information related to a quality of the recovered refrigerant from a first information terminal possessed by a provider of the recovered refrigerant via a communication network, the first information being associated with information identifying a refrigerant container that encloses the recovered refrigerant or associated with information identifying the provider of the recovered refrigerant;
storing the information acquired by the CPU in a storage; and providing, with the CPU, a second information terminal with second information which is the same as the first information stored by the storage via the communication network, the second information terminal being possessed by an entity different from the provider, wherein
the first information includes regenerated refrigerant information including at least one of composition information, oil information, water information, acid information, weight information, related to a regenerated refrigerant, the regenerated refrigerant information including information recognized by a regenerator when the provider regenerates the recovered refrigerant using the regenerator,
the first information terminal is configured to acquire, by wireless communication, the information recognized by the regenerator from the regenerator, and
the CPU is further configured to acquire, via the communication network, the information acquired from the regenerator by the first information terminal.

12. The refrigerant quality control method according to claim 11, further comprising:
causing, with the CPU, the entity different from the provider to trade the recovered refrigerant with the provider via an internet based on the second information.

13. A server that indicates quality information of a recovered refrigerant, the server comprising:
a CPU configured to acquire first information related to a quality of the recovered refrigerant, associated with information identifying a refrigerant container that encloses the recovered refrigerant or associated with information identifying a provider of the recovered refrigerant from a first information terminal possessed by the provider via a communication network, for each recovered refrigerant, a composition information of the recovered refrigerant being included in the first information; and
a storage that stores the first information acquired by the CPU in association with the information identifying the refrigerant container or in association with the information identifying the provider, for each recovered refrigerant,
the CPU being further configured to provides a second information terminal with second information based on the first information stored in the storage via the communication network, the second information terminal being possessed by an entity different from the provider, when a request signal is received from the second information terminal, wherein
the request signal includes information indicating a condition of the recovered refrigerant, and
the second information includes information identifying the refrigerant container that meets the condition of the request signal or information identifying the provider that meets the condition of the request signal.

* * * * *